(12) United States Patent
Agrawal et al.

(10) Patent No.: US 8,125,961 B2
(45) Date of Patent: Feb. 28, 2012

(54) FOUR WAY HANDSHAKE FOR ROBUST CHANNEL ESTIMATION AND RATE PREDICTION

(75) Inventors: Avneesh Agrawal, San Diego, CA (US); David Jonathan Julian, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 727 days.

(21) Appl. No.: 11/392,292

(22) Filed: Mar. 28, 2006

(65) Prior Publication Data

US 2007/0093209 A1  Apr. 26, 2007

Related U.S. Application Data

(60) Provisional application No. 60/730,245, filed on Oct. 25, 2005.

(51) Int. Cl.
*H04J 3/08* (2006.01)
(52) U.S. Cl. .................. 370/332; 455/450; 455/464
(58) Field of Classification Search ............ 370/329, 370/337, 395.41, 341, 330
See application file for complete search history.

(56) References Cited

U.S. PATENT DOCUMENTS

| | | | |
|---|---|---|---|
| 2002/0187801 A1* | 12/2002 | Vanghi | 455/522 |
| 2004/0001462 A1 | 1/2004 | Yavuz et al. | |
| 2004/0190507 A1 | 9/2004 | Wu et al. | |
| 2005/0239451 A1* | 10/2005 | Periyalwar et al. | 455/425 |
| 2007/0189282 A1* | 8/2007 | Lohr et al. | 370/370 |
| 2007/0253368 A1* | 11/2007 | Zhang et al. | 370/329 |
| 2008/0151830 A1* | 6/2008 | Leppisaari et al. | 370/329 |
| 2008/0160921 A1* | 7/2008 | Li et al. | 455/67.13 |

FOREIGN PATENT DOCUMENTS

| | | |
|---|---|---|
| JP | 2001257635 A | 9/2001 |
| JP | 2002010319 A | 1/2002 |
| JP | 2002335557 A | 11/2002 |
| JP | 2003209686 | 7/2003 |
| KR | 040084665 | 10/2004 |
| TW | I232660 | 5/2001 |
| TW | 484272 | 4/2002 |
| TW | 485707 | 5/2002 |
| TW | 496045 | 7/2002 |
| TW | I233308 | 5/2003 |
| TW | 589812 | 6/2004 |
| TW | I234954 | 6/2005 |
| WO | WO03092212 A1 | 11/2003 |
| WO | WO2004073337 A1 | 8/2004 |

(Continued)

OTHER PUBLICATIONS

International Search Report—PCT/US06/060243—International Search Authority, European Patent Office—May 22, 2007.

(Continued)

*Primary Examiner* — Marcos Batista
(74) *Attorney, Agent, or Firm* — Dang M. Vo

(57) ABSTRACT

Systems and methodologies are described that facilitate enabling communication over a time varying channel with time varying interference. According to various aspects, systems and methods are described that facilitate selecting appropriate channels and identifying rates that yield optimal capacity for the selected channels. Such systems and/or methods can evaluate a signal to interference noise ratio (SINR) at a receiving node within a multinode network to facilitate selecting the rates.

50 Claims, 13 Drawing Sheets

FOREIGN PATENT DOCUMENTS

WO    WO2005018255 A1    2/2005

OTHER PUBLICATIONS

Written Opinion—PCT/US06/060243—International Search Authority, European Patent Office—May 22, 2007.

International Preliminary Report on Patentability—PCT/US06/060243—The International Bureau of WIPO, Geneva, Switzerland—Apr. 29, 2008.
Taiwan Search Report—095139421—TIPO, Dec. 29, 2009.
Translation of Office Action in Japanese application 2008-538160 corresponding to U.S. Appl. No. 11/392,292, dated Jan. 18, 2011.

* cited by examiner

FOUR WAY HANDSHAKE FOR ROBUST CHANNEL ESTIMATION AND RATE PREDICTION

CROSS-REFERENCE TO RELATED APPLICATIONS

This application claims the benefit of U.S. Provisional Patent application Ser. No. 60/730,245 entitled "FOUR WAY HANDSHAKE FOR ROBUST CHANNEL ESTIMATION AND RATE PREDICTION" which was filed Oct. 25, 2005. The entirety of the aforementioned application is herein incorporated by reference.

BACKGROUND

I. Field

The following description relates generally to wireless communications, and more particularly to utilizing a four way handshake to enable channel estimation and rate prediction in a wireless communication system.

II. Background

Wireless communication systems are widely deployed to provide various types of communication; for instance, voice and/or data may be provided via such wireless communication systems. A typical wireless communication system, or network, can provide multiple users access to one or more shared resources. For instance, a system may use a variety of multiple access techniques such as Frequency Division Multiplexing (FDM), Time Division Multiplexing (TDM), Code Division Multiplexing (CDM), and others.

Interference is commonly encountered in connection with wireless communication systems employing any type of multiple access technique. For example, in a multinode network, a first node may receive a signal from a second node as well as interference from disparate surrounding nodes. Further, communication may be effectuated over a time varying channel with time varying interference, where the channel may be a time slot, a frequency band, a spreading code assignment, or a combination thereof. Thus, there exists a need in the art for systems and/or methodologies for improving selection of appropriate channels and rates to facilitate optimizing capacity.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with enabling communication over a time varying channel with time varying interference. According to various aspects, systems and methods are described that facilitate selecting appropriate channels and identifying rates that yield optimal capacity for the selected channels. Such systems and/or methods can evaluate a signal to interference noise ratio (SINR) at a receiving node within a multinode network to facilitate selecting the rates.

According to related aspects, a method of wireless communication that estimates channel interference can comprise sending a request, receiving a grant of a channel assignment responsive to the request, sending a pilot utilizing the granted channel assignment, receiving a rate assignment based on a signal to interference noise ratio, and transmitting data at the assigned rate. The grant can include a channel identification to assign the channel, hybrid automatic repeat request (HARQ) information including at least one of a HARQ fragment number, data indicating whether a transmitter should transmit a new packet, and a HARQ retransmission of an old packet, and/or an assigned power. The method can further comprise sending the pilot at the assigned power, transmitting the data at the assigned power, sending the request to an intended recipient, and/or pipelining the data by sending the request to an intermediate node within a multihop topology. The method can additionally comprise transmitting the data on a substantially similar channel and at a substantially similar power as compared to sending of the pilot and/or interlacing a second data transmission. Interlacing the second data transmission can further comprise sending a second request during a first time slot during which the pilot is sent, receiving a second grant during a second time slot during which the rate assignment is received, transmitting a second pilot according to the second grant during a third time slot during which the data is transmitted, receiving a second rate assignment, and transmitting a second data block based upon the second rate assignment.

Another aspect relates to an apparatus that optimizes capacity in a wireless communication system that can comprise a memory that stores information associated with estimating a channel; and a processor, coupled to the memory, that is configured to transmit a grant, receive a pilot transmitted based upon the grant, and estimate a signal to interference noise ratio (SINR) associated with the received pilot. The processor can be configured to determine a strength of the pilot and a strength of inference and/or analyze the SINR based upon the pilot obtained from a sender node during a time slot and interference caused by at least one disparate node concurrently transmitting a disparate pilot during the time slot. Further, the processor can be configured to utilize the SINR to transmit a rate assignment, transmit the grant in response to obtaining a request, transmit the grant that includes an assigned channel and an assigned power, evaluate the SINR of the received pilot transmitted with the assigned channel and the assigned power, and/or estimate a SINR of data transmission based upon the SINR of the pilot by employing the assigned channel and the assigned power for both data transmission and pilot transmission for simultaneously transmitting nodes.

Yet another aspect relates to a wireless communication apparatus for estimating a channel and predicting a rate based upon a signal to interference noise ratio (SINR) that can comprise means for transmitting a request; means for receiving a grant in response to the request; means for transmitting a pilot based on the grant; means for receiving a rate assignment based on the SINR associated with the pilot; and means for transmitting data at the assigned rate.

Still another aspect relates to a computer-readable medium having a computer program stored thereon with computer-executable instructions for receiving a request, transmitting a grant of a channel assignment, receiving a pilot on the granted channel, determining a signal to interference noise ratio (SINR) during transmission of the pilot, transmitting a rate based on the SINR, and obtaining data at the assigned rate. The computer-readable medium can further comprise instructions for terminating a hybrid automatic repeat request (HARQ), correcting errors associated with the obtained data, determining whether an error is unable to be corrected, retransmitting the grant upon determining the error is unable to be corrected, and/or repeating the transmission of the grant, receipt of the pilot, determination of the SINR, transmission of the rate, receipt of the data, and attempt to correct of the errors until all errors are corrected. Additionally, the computer-readable medium can comprise instructions for pipelining the obtained data and/or pipelining the data by initiating a transmission by sending a disparate request while transmitting the grant. Further, the computer-readable medium can comprise instructions for pipelining the obtained data further comprising sending a second request to a disparate node during a first time slot during which the grant is transmitted; receiving a second grant from the disparate node during a second time slot during which the pilot is received; transmitting a second pilot according to the second grant during a third time slot during which the rate assignment is transmitted; receiving a second rate assignment during a fourth time slot during which the data is obtained; and transmitting the data to the disparate node based upon the second rate assignment. Moreover, the computer-readable medium can comprise instructions for mitigating end to end latency associated with data transmission through a plurality of nodes by transmitting a disparate request to a disparate node while transmitting the grant to a sending node.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
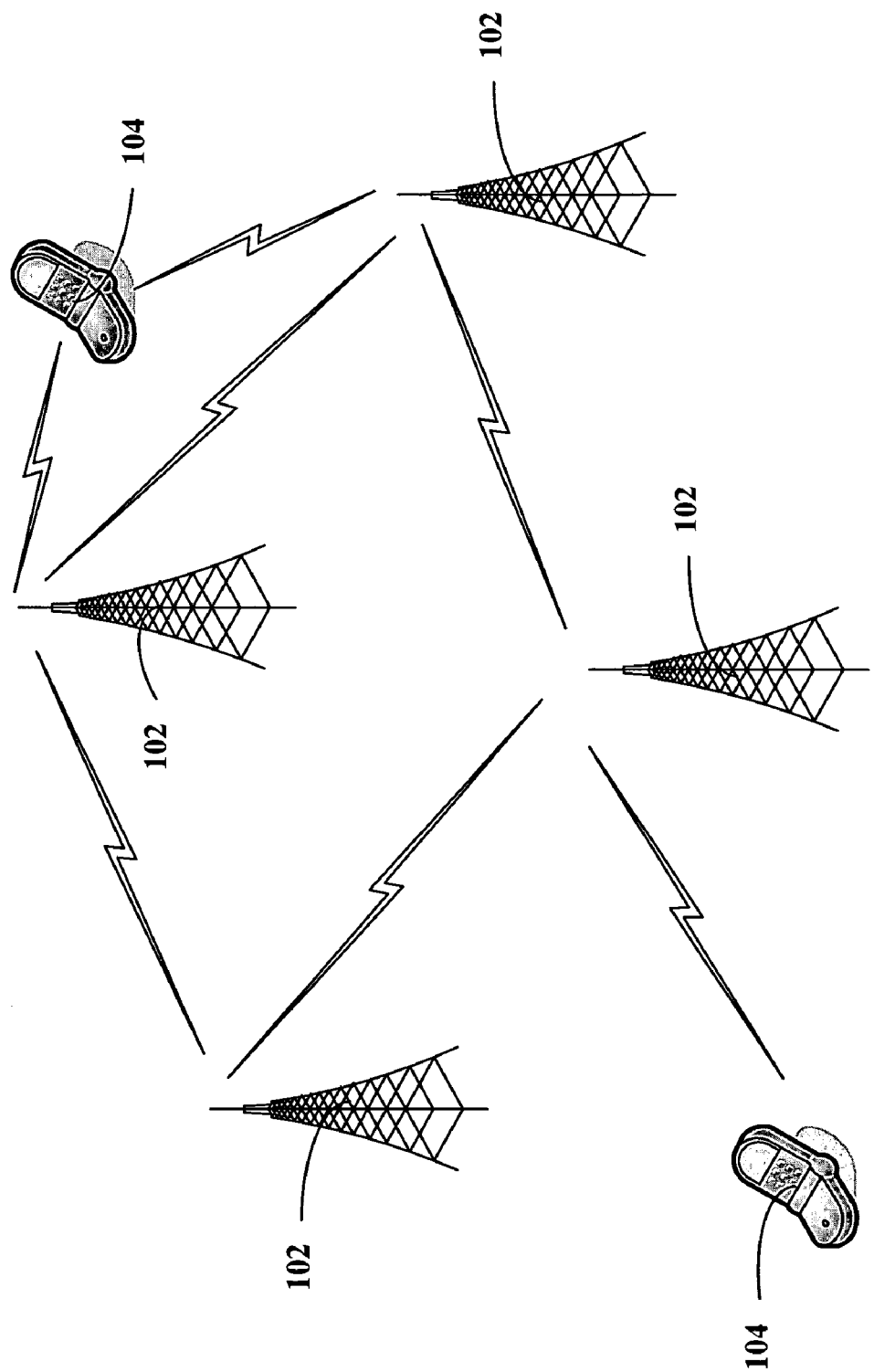
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a subscriber station. A subscriber station can also be called a system, a subscriber unit, mobile station, mobile, remote station, access point, remote terminal, access terminal, user terminal, user agent, a user device, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, various media capable of storing, containing, and/or carrying instruction(s) and/or data.

Referring now to FIG. 1, a wireless communication system 100 is illustrated in accordance with various embodiments presented herein. System 100 can comprise one or more access points 102 in one or more sectors that receive, transmit, repeat, etc., wireless communication signals to each other and/or to one or more mobile devices 104. Each access point 102 can comprise a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art. Mobile devices 104 can be, for example, cellular phones, smart phones, laptops, handheld communication devices, handheld computing devices, satellite radios, global positioning systems, PDAs, and/or any other suitable device for communicating over wireless communication system 100.

Access points 102 and/or mobile devices 104 may be nodes within wireless communication system 100. Within a multi-node system (e.g., wireless communication system 100, etc.), a node pair can include a first node (e.g., access point 102, mobile device 104, etc.) that transmits and/or receives data from a second node (e.g., access point 102, mobile device 104, etc.). By way of illustration, at a particular time, any number of transmitting nodes may concurrently transmit data to respective receiving nodes. Any access point 102 and/or mobile device 104 can communicate with any disparate access point 102 and/or mobile device 104. Such communication may employ a time varying channel (e.g., a time slot, a frequency band, a spreading code assignment, a combination thereof, etc.). Further, the channel may be associated with time varying interference. It is to be appreciated that the interference may be, for instance, associated with concurrent, disparate transmission transferred between disparate node pairs; however, the claimed subject matter is not so limited.

To enable optimizing capacity, a communicating node pair may analyze channel conditions and select appropriate channels and/or rates (e.g., modulation, coding format, etc.) based at least in part upon channel conditions. For instance, a receiving node may assign channel resources (e.g., channel identification (ID), power, etc.) to a corresponding transmitting node and thereafter estimate signal strength and interference. Based at least in part upon an estimated signal to interference noise ratio (SINR), the receiving node may assign a rate to the transmitting node, which may be utilized in connection with data transmission by the transmitting node. Thus, the receiving node may enable identifying interference from disparate nodes prior to a start of data transmission. In contrast, with conventional packet systems a receiving node typically is unable to evaluate interfering nodes or modify rates based on a SINR prior to transmission by a corresponding transmitting node.

In some embodiments, a network can be constructed utilizing solely peer-to-peer communication without utilizing access points 102. In further embodiments, the network can include both access points 102 (infrastructure mode) and peer-to-peer communication. These types of infrastructure are referred to as ad-hoc networks or independent basic service sets (IBSS). Ad-hoc networks can be self-configuring whereby when mobile device 104 (or access point 102) receives communication from another mobile device 104, the other mobile device 104 is added to the network. As mobile devices 104 leave the area, they are dynamically removed from the network. Thus, the topography of the network can be constantly changing.

Figure 2:
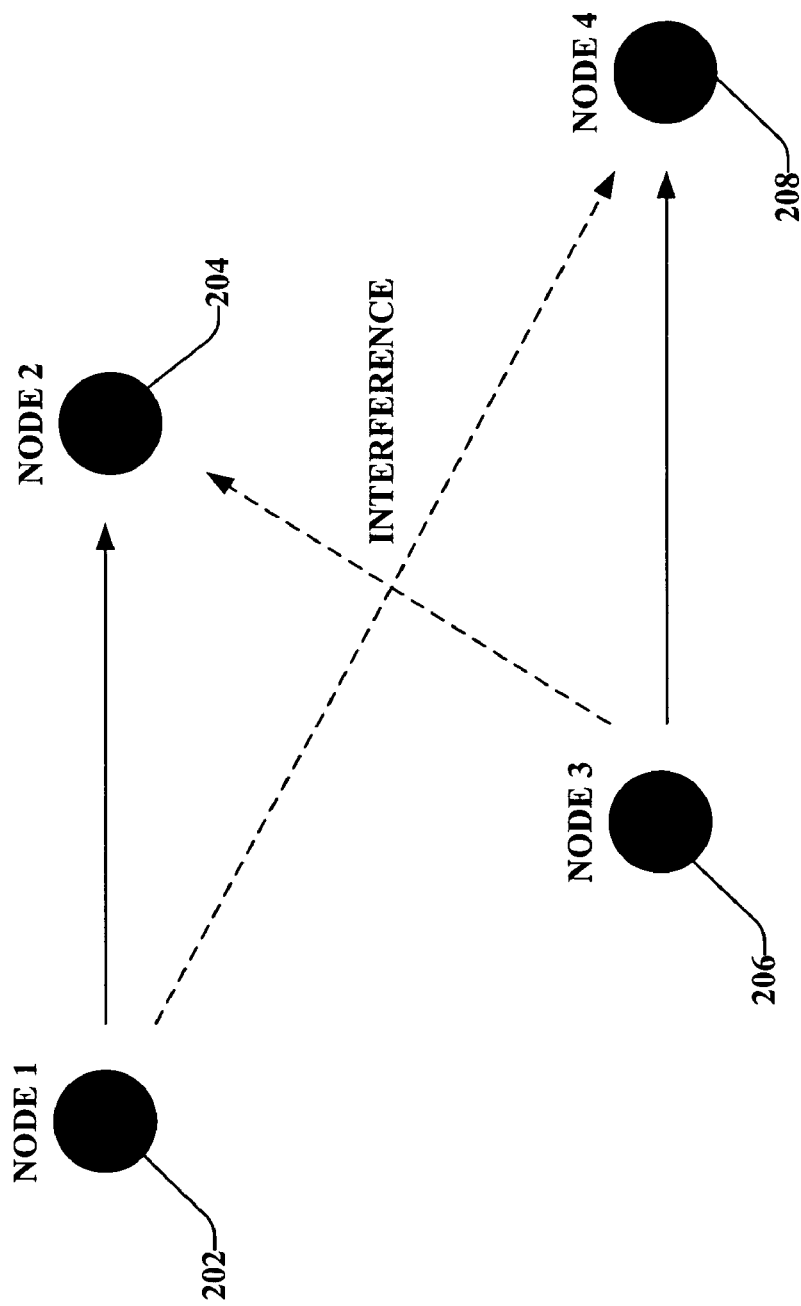
FIG. 2 is an illustration of a wireless communication system that evaluates a signal to interference noise ratio (SINR) and optimizes capacity based at least in part on the identified SINR.

With reference to FIG. 2, illustrated is a wireless communication system 200 that evaluates a signal to interference noise ratio (SINR) and optimizes capacity based at least in part on the identified SINR. System 200 includes any number of nodes (e.g., node 1 202, node 2 204, node 3 206, node 4 208, etc.). Although four nodes 202-208 are depicted, it is to be appreciated that system 200 can include any disparate number of nodes. According to an example, node 1 202 and node 2 204 can be a node pair and node 3 206 and node 4 208 can be a second node pair. Pursuant to this example, node 1 202 and node 3 206 can transmit data to node 2 204 and node 4 208, respectively. Additionally, node 2 204 and node 4 208 can receive interference due to transmissions by node 3 206 and node 1 202, respectively. According to an illustration, for a pair of nodes (e.g., node 1 202 transmitting to node 2 204), a receiving node (e.g., node 2 204) may select a rate (e.g., combination of modulation and code format, etc.) for utilization by a transmitting node (e.g., node 1 202) by evaluating a strength of the signal (e.g., pilot) from the transmitting node and the interference at the receiving node caused by disparate transmitting nodes (e.g., node 3 206). In conventional packet systems, such a determination of the interference may be difficult due to a power level of disparate transmitting nodes (e.g., node 3 206) being unknown at a beginning of a transmission.

Moreover, the communication sent from the transmitting node (e.g., node 1 202, node 3 206, etc.) to the receiving node (e.g., node 2 204, node 4 208, etc.) may be referred to as a forward link. Further, the communication sent from the receiving node to the transmitting node may be referred to as a reverse link. Also, the transmitting node may be coupled to a data source (e.g., storage, memory, and the like) (not shown) and the receiving node may be coupled to an interface device (not shown) such as, for instance, a display.

System 200 can be an ad-hoc wireless communication network, which is a network comprising only terminals or stations with no access points. In such a network, devices within the network can function similar to base stations and relay the traffic to other devices until the traffic reaches its ultimate destination. In some embodiments, an ad-hoc network can include both terminals and access points.

Figure 3:
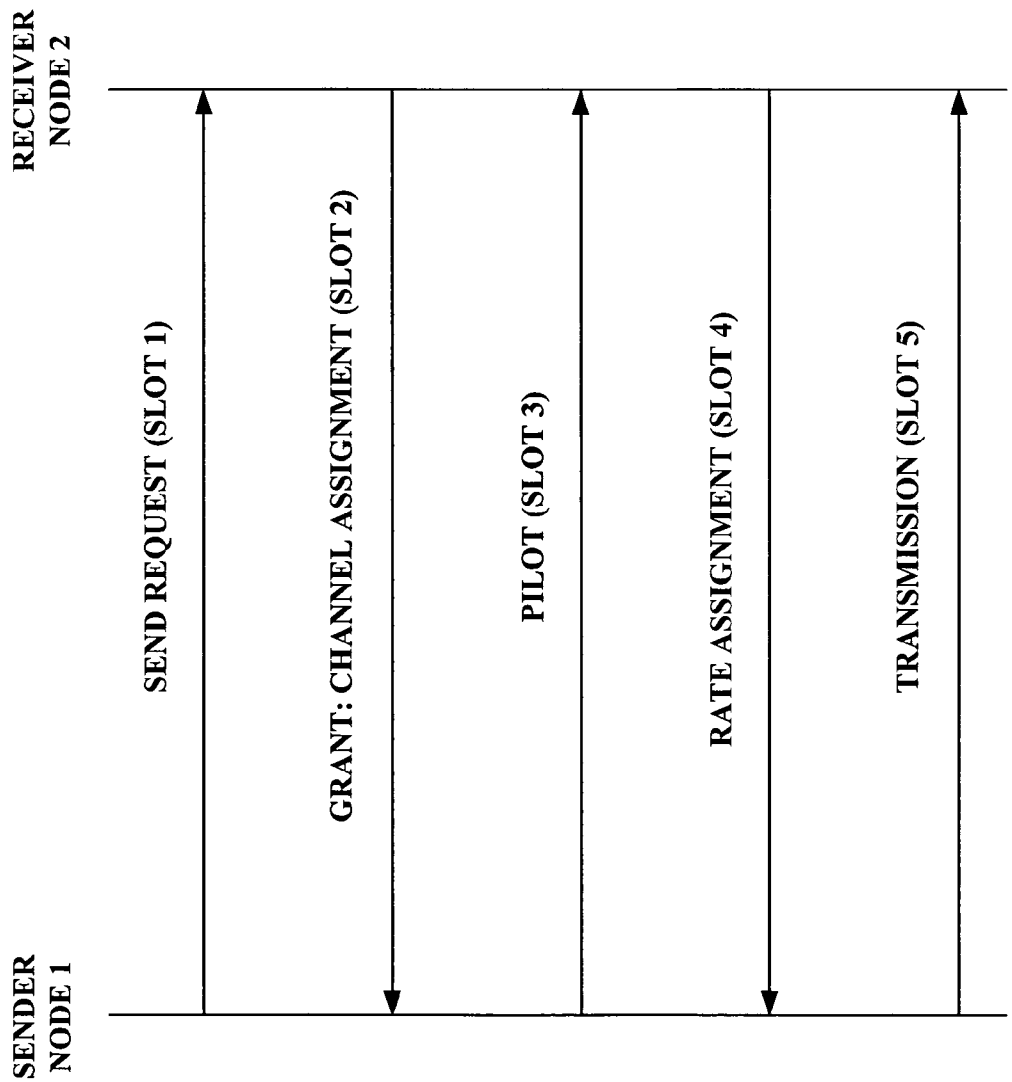
FIG. 3 is an illustration of an exemplary message exchange scheme for a four way handshake that provides robust channel estimation and rate prediction.

With reference to FIG. 3, illustrated is an exemplary message exchange scheme 300 for a four way handshake that provides robust channel estimation and rate prediction. Message exchange scheme 300 may pertain to transmissions from node 1 202 to node 2 204 of FIG. 2; however, the claimed subject matter is not so limited. During time slot 1, a sender node (e.g., node 1 202) transmits a request to a receiver node (e.g., node 2 204). The receiver node provides a grant to the sender node during time slot 2. The grant may assign channel resources including, for example, an assigned power and/or an assigned channel (e.g., channel identification (ID)). The channel may be a frequency band (e.g., certain subcarriers of an available band), a time slot (e.g., certain subslots of a traffic slot), a spreading code assignment, a combination thereof, or the like. Further, the grant may additionally or alternatively include information associated with a hybrid automatic repeat request (HARQ). For example, the grant may include a HARQ fragment number, data (e.g., bit, . . . ) indicating whether a transmitter should transmit a new packet, a HARQ retransmission of an old packet, etc. The sender node transmits a pilot via employing the assigned power and/or the assigned channel during time slot 3. The receiver node may analyze the SINR based upon the pilot obtained from the sender node during time slot 3 as well as additional interference that, for example, may be caused by disparate nodes concurrently transmitting pilots during time slot 3.

During time slot 4, a rate assignment may be communicated from the receiver node to the sender node. The rate assignment may relate to a modulation format, a coding format, etc. The sender node employs the power and/or the channel assigned in the grant obtained during time slot 2 and the rate assigned in the rate assignment provided during time slot 4 to transmit data to the receiver node during time slot 5. It is to be appreciated that any number of additional node pairs can concurrently utilize message exchange scheme 300. By way of illustration and not limitation, message exchange scheme 300 may enable providing synchronous transmissions between any number of node pairs. Thus, for instance, node 1 202 and node 3 206 of FIG. 2 may both send requests during time slot 1 and transmit data during time slot 5, etc.; however, the claimed subject matter is not so limited.

Message exchange scheme 300 provides that data transmission is preceded by a pilot transmission (e.g., which may be sent on a channel and/or at a power with which a subsequent data transmission may be transferred). Thus, a rate may be assigned to the transmitter (e.g., sender node, node 1 202 of FIG. 2, etc.) based on a SINR observed at the receiver (e.g., node 2 204 of FIG. 2, etc.) during the pilot transmission. According to an illustration, since each of the nodes simultaneously transmitting the pilot employs the assigned channel and/or power, the SINR evaluated at the receiver during transmission of the pilot is similar to the SINR observed at the receiver during data transmission; therefore, accurate rate prediction may be provided.

Pursuant to an example, message exchange scheme 300 may enable a node to perform a bulk transfer by way of interlacing transmissions. For instance, the sender node may transmit a request in time slot 1, which yields data transmission during time slot 5 as described above. Further, the sender node may also transmit a request during time slot 3 (e.g., to the same receiver node 2, a disparate node, etc.). Pursuant to an example, node 1 may transmit the pilot and a second request to node 2 during time slot 3; however, the claimed subject matter is not so limited. Further, although not shown, in response to the sender node providing the request during time slot 3 a channel assignment may be provided in time slot 4, a pilot may be transmitted in time slot 5, a rate assignment may be sent during time slot 6, and data transmission may occur during time slot 7. Accordingly, interlacing allows the sender node to transmit during additional data transmission slots.

Figure 4:
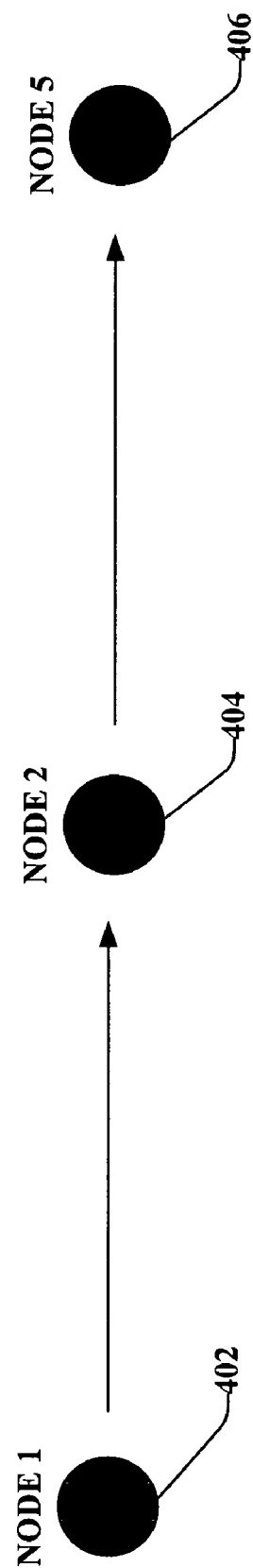
FIG. 4 is an illustration of a wireless communication system that enables pipelining to transfer data over multiple nodes.

Turning to FIG. 4, illustrated is a wireless communication system 400 that enables pipelining to transfer data over multiple nodes. System 400 may include any number of nodes (e.g., node 1 402, node 2 404, node 5 406, etc.); accordingly, the claimed subject matter is not limited to three nodes as depicted. Pursuant to an example, node 1 402 may transmit data to node 2 404, which in turn may transfer the data to node 5 406. It is to be appreciated that the data may be transmitted through any number of nodes until arrival at a destination node. Thus, system 400 may provide a multihop topology, where a communication or transmission is transferred through a number of hops or segments instead of directly to an intended recipient (e.g., base station, mobile device, etc.).

Figure 5:
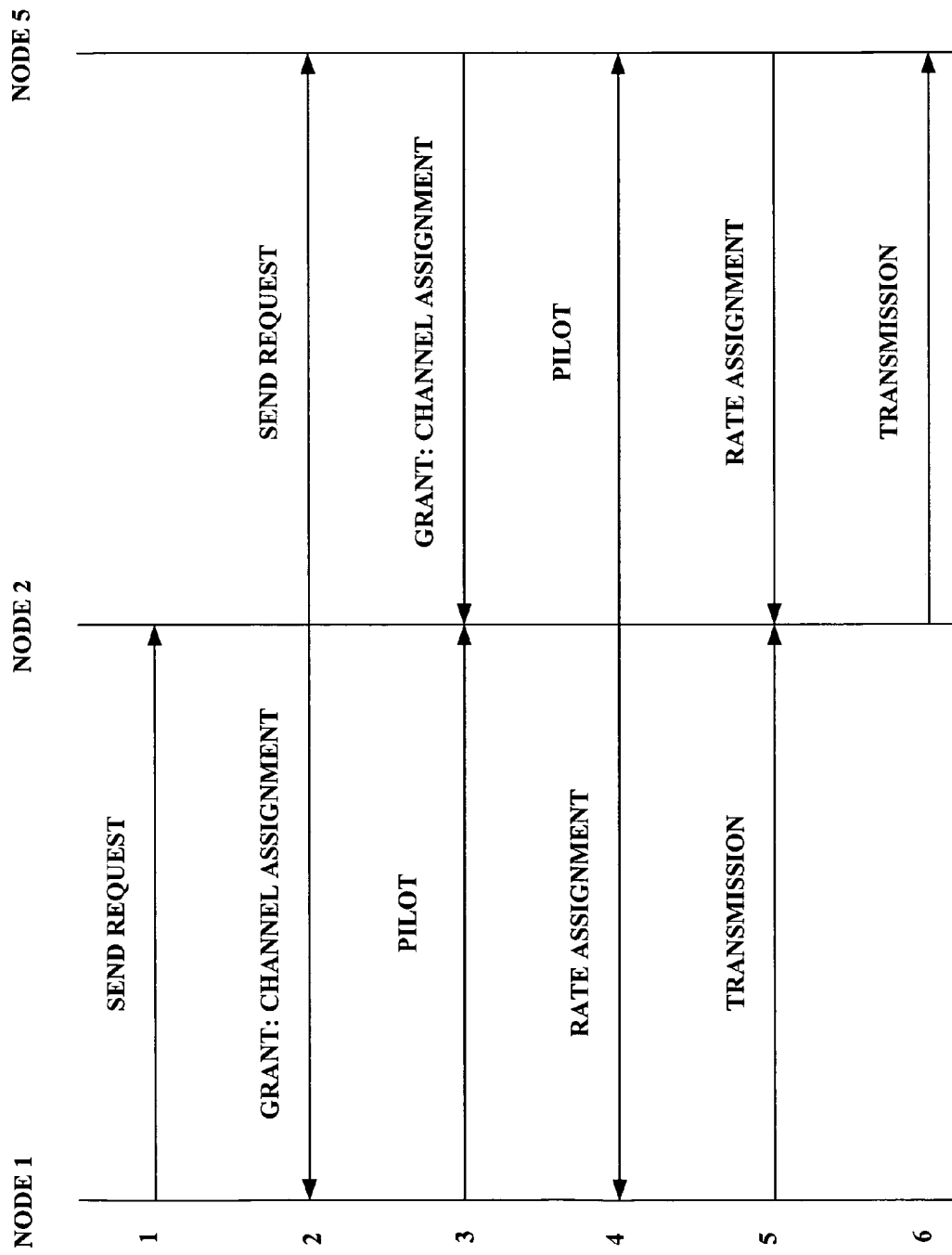
FIG. 5 is an illustration of an exemplary pipelining message exchange scheme.

With reference to FIG. 5, illustrated is an exemplary pipelining message exchange scheme 500 relating to wireless communication system 400 of FIG. 4. Pipelining in accordance with scheme 500 may enable mitigating transmission latency as compared to conventional techniques. Although pipelining through one intermediate node is depicted, it is contemplated that pipelining message exchange scheme 500 can enable pipelining data through any number of nodes and the claimed subject matter is not limited to this example. During time slot 1, node 1 may send a request to node 2. Thereafter, during time slot 2, node 2 may send a request to node 5 and a grant to node 1. For instance, transmission of the request and the grant may be made simultaneously, at a similar time, etc. The grant may assign a channel and/or a power to be employed by node 1 for transmission to node 2. Additionally, node 1 may transmit a pilot to node 2 during time slot 3 utilizing the channel and/or power associated with the grant obtained from node 2, while node 5 may send a grant (e.g., assigning a channel and/or power for transmission by node 2 to node 5) in the same time slot. Additionally, node 2 may estimate a SINR by evaluating a signal (e.g., based upon the pilot transmitted by node 1) and interference (e.g., related to any disparate node concurrently transmitting during time slot 3). Based upon the SINR, an appropriate rate assignment for such communication may be identified.

During time slot 4, node 2 may send a rate assignment (e.g., modulation format, coding format, etc.) to node 1 and transmit a pilot to node 5. Accordingly, node 5 may evaluate a SINR associated with the pilot transmission, and determine a corresponding rate assignment. Within time slot 5, node 1 may send a data transmission in accordance with the grant and the rate assignment to node 2. Also, during the same time slot, node 5 may transmit information associated with the rate assignment identified based upon the pilot transmitted during time slot 4 to node 2. Thereafter, during time slot 6, node 2 transmits data to node 5 pursuant to the grant obtained during time slot 3 and the rate assignment received during time slot 5. Message exchange scheme 500 mitigates end to end latency associated with transmitting data from node 1 to node 5 in comparison to allowing node 2 to send a request in time slot 6 (after receiving the data in time slot 5). More particularly, message exchange scheme 500 enables node 2 to send a second request to node 5 in the time slot following receipt of a first request from node 1.

Figure 6:
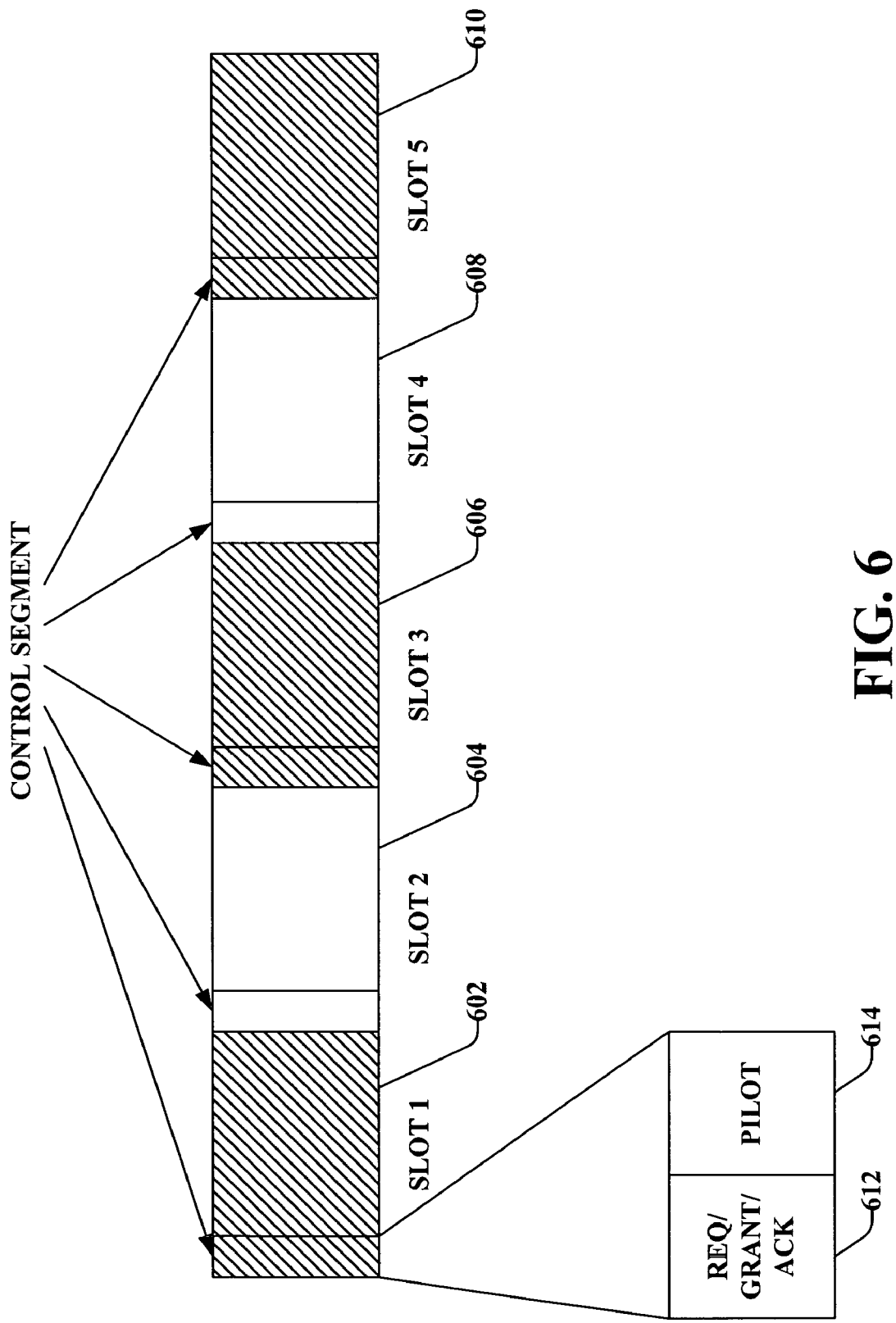
FIG. 6 is an illustration of a slotting structure that may be utilized in connection with providing robust channel estimation and rate prediction.

Turning to FIG. 6, illustrated is a slotting structure 600 that may be utilized in connection with providing robust channel estimation and rate prediction. The slotting structure 600 may include any number of slots (e.g., slot 1 602, slot 2 604, slot 3, 606, slot 4 608, slot 5 610, etc.). Additionally, each of the slots may include several channels (e.g., time slots, frequency bands, channels associated with disparate spreading code assignments, a combination thereof, etc.). Pursuant to an example, slotting structure 600 may be applicable to a time division duplex (TDD) system, where nodes 1 and 3 of FIG. 2 may transmit in the hatched slots (e.g., slot 1 602, slot 3 606, slot 5 610, etc.), while nodes 2 and 4 of FIG. 2 may transmit in the unhatched slots (e.g., slot 2 604, slot 4 608, etc.); however, the claimed subject matter is not limited to such example. Each of the slots 602-610 may be further subdivided into a control segment and a data segment. Further, the control segment may be divided into a REQ/Grant/ACK segment 612 and a pilot segment 614.

Pursuant to an example, a transmitting node (e.g., node 1 202 of FIG. 2) may transmit a request to a receiving node (e.g., node 2 204 of FIG. 2) in REQ/Grant/ACK segment 612 associated with slot 1 602. Further, the transmitting node may obtain a grant from the receiving node in REQ/Grant/ACK segment 612 related to slot 2 604. Thereafter the transmitting node may send a pilot transmission during pilot segment 614 of slot 3 606 and receive a rate assignment in slot 4 608. Moreover, in the data segment of slot 5, the transmitting node may send a data transmission to the receiving node. It is to be appreciated that the claimed subject matter is not limited to the aforementioned example.

Figure 7:
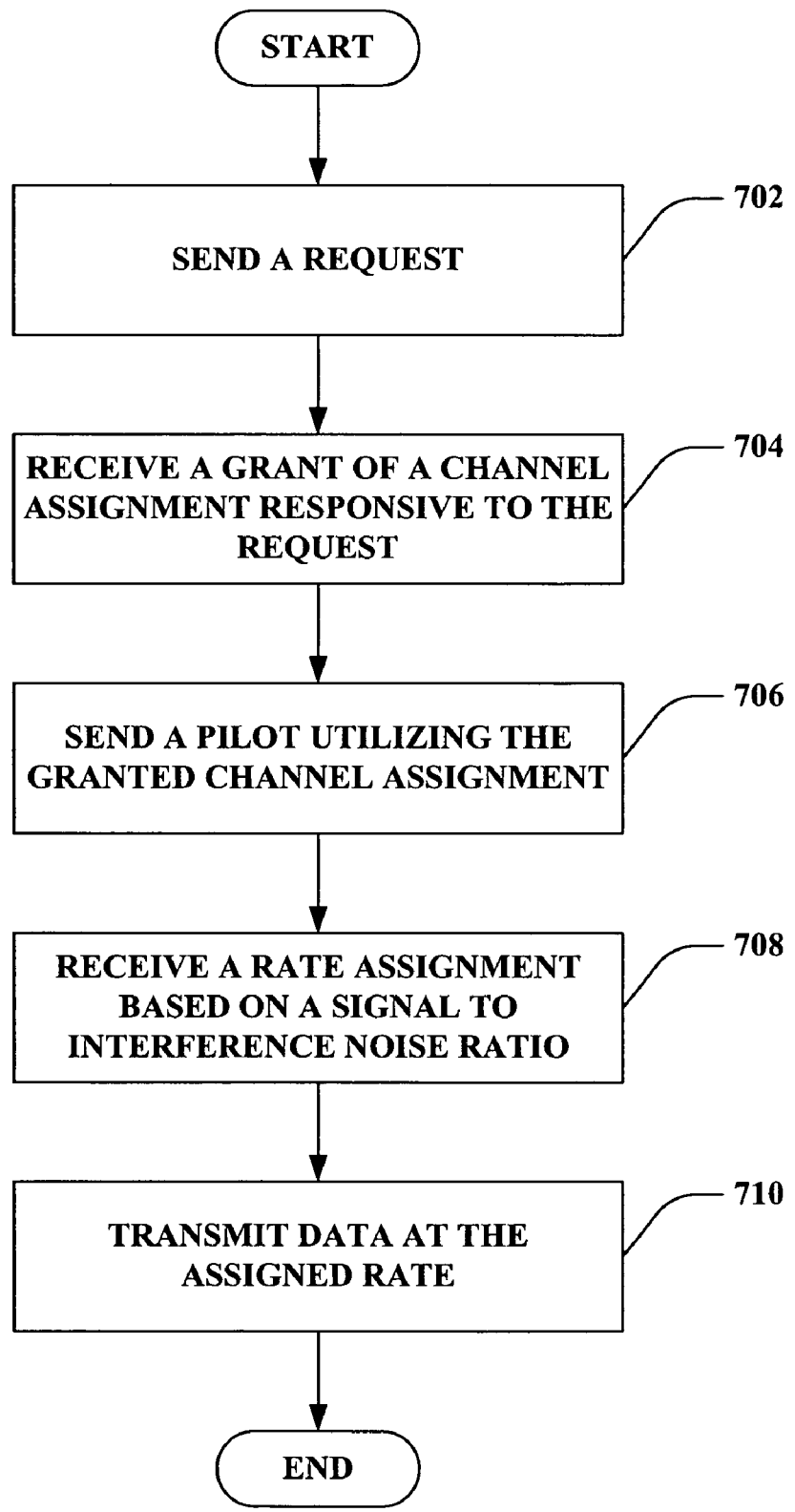
FIG. 7 is an illustration of a methodology that facilitates transmitting data based at least in part upon estimated signal strength and interference.
Figure 8:
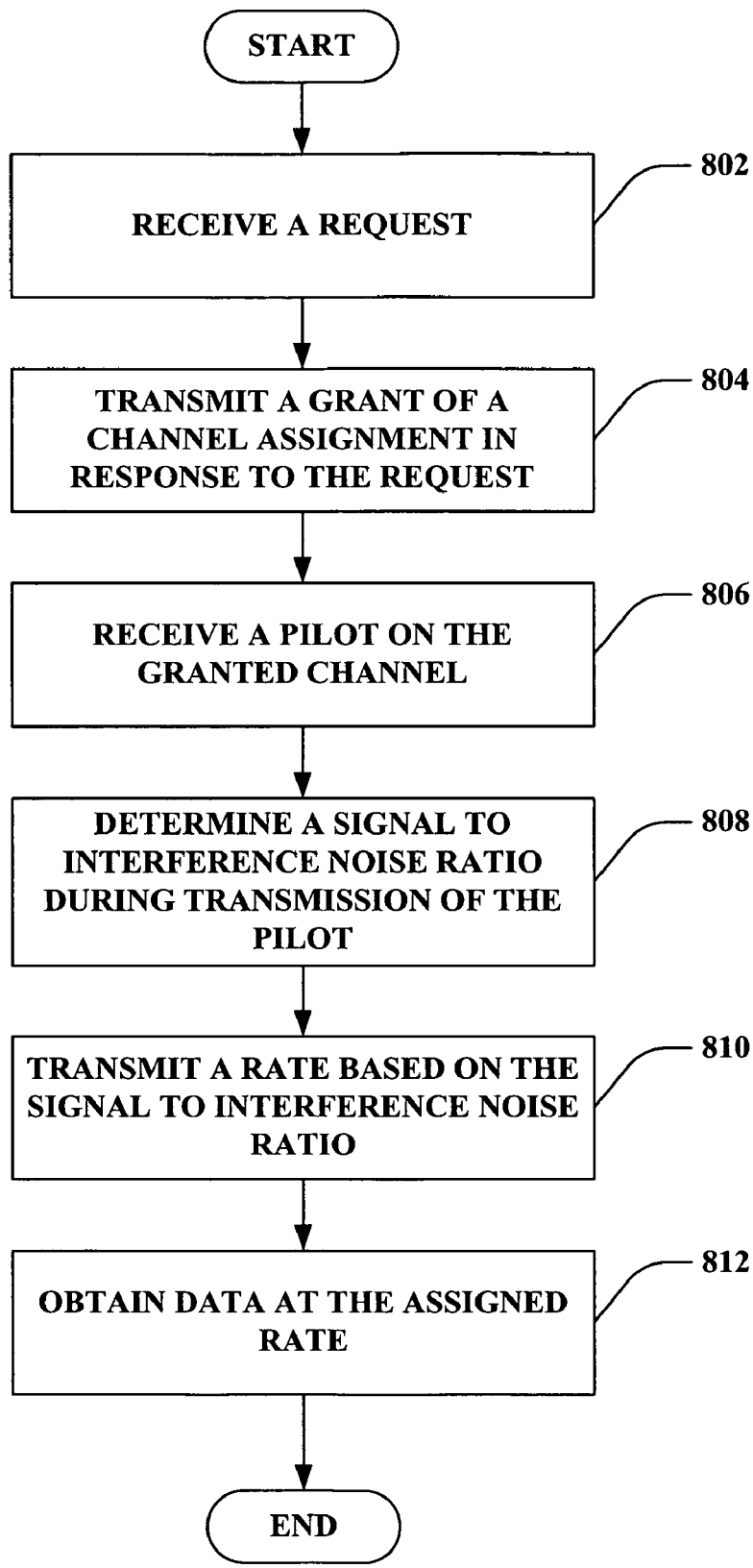
FIG. 8 is an illustration of a methodology that facilitates estimating channel conditions to enable receiving data transmissions.
Figure 9:
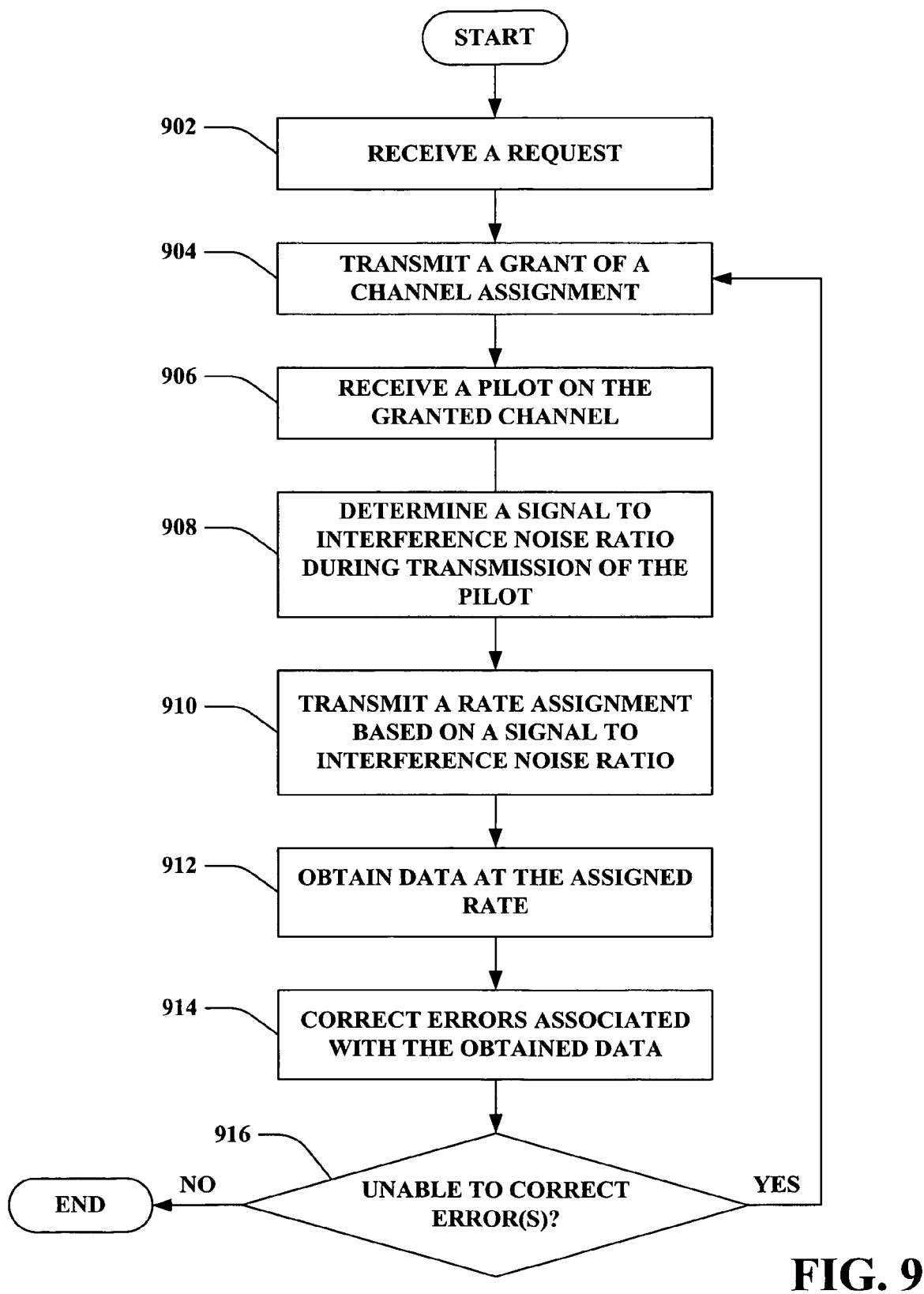
FIG. 9 is an illustration of a methodology that facilitates improving hybrid automatic repeat request (HARQ) termination.

Referring to FIGS. 7-9, methodologies relating to utilizing a four way handshake for robust channel estimation and rate prediction are illustrated. For example, methodologies can relate to employing channel estimation and/or rate prediction in an FDMA environment, an OFDMA environment, a CDMA environment, a WCDMA environment, a TDMA environment, an SDMA environment, or any other suitable wireless environment. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 7, illustrated is a methodology 700 that facilitates transmitting data based at least in part upon estimated signal strength and interference. At 702, a request may be transmitted. The request may be transmitted to a receiving node. Further, the receiving node may be an intended recipient and/or an intermediate node within a multihop topology, for example. At 704, a grant may be received in response to the request. The obtained grant may include an assignment of channel resources such as, for instance, a channel (e.g., a time slot, a frequency band, a spreading code assignment, a combination thereof, etc.), a power, etc. At 706, a pilot may be sent utilizing the channel assignment related to the grant. Thus, pursuant to an example, a particular channel and power as specified in the obtained grant may be employed in connection with transferring the pilot. According to this example, the pilot transmission may be effectuated with a substantially similar channel and power as may be employed when transmitting data, and therefore, accuracy associated with channel estimation (e.g., evaluation of signal to interference noise ratio (SINR)) may be enhanced.

At 708, a rate assignment may be received based on a signal to interference noise ratio (SINR) associated with the pilot transmission. The rate assignment may assign a coding format and/or a modulation format. At 710, data may be transmitted at the assigned rate. Further, the data transmission may be effectuated utilizing the channel assignment associated with the grant.

Now referring to FIG. 8, illustrated is a methodology 800 that facilitates estimating channel conditions to enable receiving data transmissions. At 802, a request may be received. The request may be obtained in a time slot during which a node is to receive data (e.g., from a corresponding node within a node pair that includes the receiving node, etc.). At 804, a grant may be transmitted in response to the request. The grant may indicate particular resources that are to be utilized in connection with future communication via a channel. For instance, the grant may assign a channel and/or a power to be employed.

At 806, a pilot may be received on the granted channel. The pilot may be analyzed at 808 along with any received interference to determine a signal to interference noise ratio (SINR) associated with the pilot transmission. The signal strength may be determined by identifying the strength of the pilot associated with the request. Additionally, since any number of pilots may be transferred at a similar time, the interference may be evaluated by analyzing the strength of any disparate transmissions (e.g., pilots) that may be transferred during the same time slot. Each of the pilots employs the channel and/or power assigned in the corresponding grants, and thus, the SINR determined for the pilots may provide an accurate estimate of a SINR associated with data transmission. At 810, a rate based on the determined SINR may be transmitted. The rate may provide a coding format and/or a modulation format, for example. At 812, data may be obtained at the assigned rate (and via the assigned channel and/or power).

With reference to FIG. 9, illustrated is a methodology 900 that facilitates improving hybrid automatic repeat request (HARQ) termination. At 902, a request may be received. At 904, a grant of a channel assignment (and/or an assigned power) may be transmitted. A pilot may be received at 906 on the granted channel (and/or with the assigned power). Further, at 908, an analysis of a SINR related to the received pilot (and any disparate pilots transmitted at a substantially similar time) may be conducted to determine an appropriate rate to be utilized in connection with a future data transmission related to the request. At 910, a rate assignment based on the SINR may be transmitted. Additionally, at 912, data transmitted with the assigned rate (and/or on the assigned channel and/or with the assigned power) may be obtained.

At 914, errors associated with the obtained data may be corrected. For example, the obtained data may include an encoded data block as well as error-detection information (e.g., CRC) with an error-correction code (e.g., Reed-Solomon code, Turbo code, etc.). Thus, the error-correction code may be decoded and detected errors may be corrected. At 916, it is determined whether any of the error(s) where unable to be correct. If no errors were unable to be corrected, methodology 900 ends. However, if one or more errors were unable to be corrected, methodology 900 returns to 904 and a grant is retransmitted.

Although the exchange of a pilot and a rate grant may yield an extra delay, this potential disadvantage may be offset by faster HARQ termination. Conventionally, HARQ termination utilizes more than one slot due to inaccuracies associated with the rate estimation during the first slot. In contrast, methodology 900 provides enhanced reliability in connection with the rate estimation, and hence, reduces the number of HARQ transmissions. Additionally, when employing a HARQ retransmission, a request message need not be received; rather, the HARQ retransmission may be initiated by sending the grant at 904.

It will be appreciated that, in accordance with one or more aspects described herein, inferences can be made regarding estimating a channel (e.g., SINR), predicting a rate for transmission via the channel, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences regarding resource assignment related to a grant (e.g., channel, power, etc.), SINR estimation, assigning a rate, etc. By way of further illustration, an inference may be made pertaining to whether obtained data includes error(s) and/or whether the error(s) are correctable. It will be appreciated that the foregoing examples are illustrative in nature and are not intended to limit the number of inferences that can be made or the manner in which such inferences are made in conjunction with the various embodiments and/or methods described herein.

Figure 10:
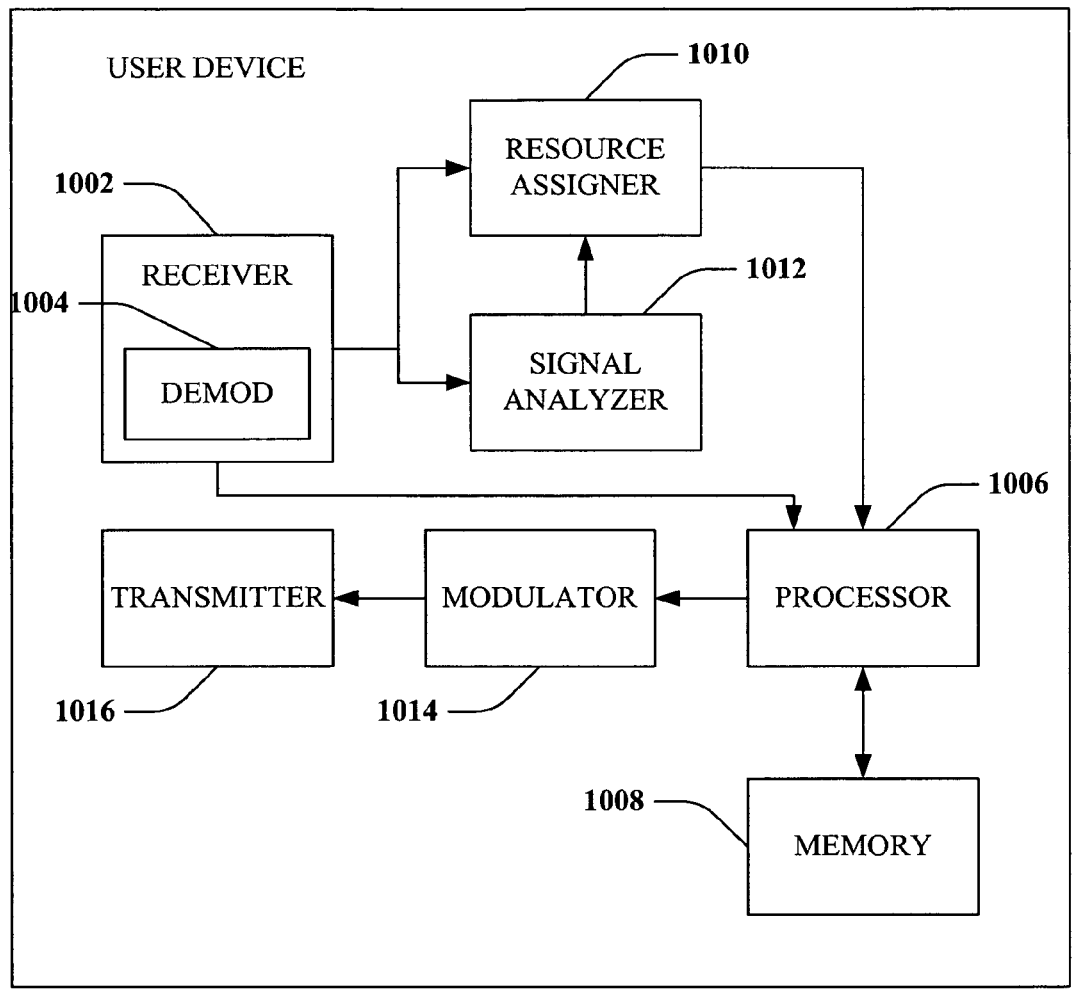
FIG. 10 is an illustration of a user device that facilitates estimating a channel and/or predicting a rate to be utilized in connection with a time varying channel with time varying interference.

FIG. 10 is an illustration of a user device 1000 that facilitates estimating a channel and/or predicting a rate to be utilized in connection with a time varying channel with time varying interference. User device 1000 comprises a receiver 1002 that receives a signal from, for instance, a receive antenna (not shown), and performs typical actions thereon (e.g., filters, amplifies, downconverts, etc.) the received signal and digitizes the conditioned signal to obtain samples. Receiver 1002 can be, for example, an MMSE receiver, and can comprise a demodulator 1004 that can demodulate received symbols and provide them to a processor 1006 for channel estimation. Processor 1006 can be a processor dedicated to analyzing information received by receiver 1002 and/or generating information for transmission by a transmitter 1016, a processor that controls one or more components of user device 1000, and/or a processor that both analyzes information received by receiver 1002, generates information for transmission by transmitter 1016, and controls one or more components of user device 1000.

User device 1000 can additionally comprise memory 1008 that is operatively coupled to processor 1006 and that may store data to be transmitted, received data, information related to available channels, data associated with analyzed signal and/or interference strength, information related to an assigned channel, power, rate, or the like, and any other suitable information for estimating a channel and communicating via the channel. Memory 1008 can additionally store protocols and/or algorithms associated with estimating and/or utilizing a channel (e.g., performance based, capacity based, etc.).

It will be appreciated that the data store (e.g., memory 1008) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1008 of the subject systems and methods is intended to comprise, without being limited to, these and any other suitable types of memory.

Receiver 1002 is further operatively coupled to a resource assigner 1010 that allocates resources in response to obtaining data (e.g., a request, a pilot, etc.). For instance, receiver 1002 may receive a request and provide the request and/or information associated with the request to resource assigner 1010. In response to the request and/or information associated with the request, resource assigner 1010 may identify resources to be utilized (by a disparate node) in connection with future data transmissions. By way of illustration, the assigned resources may be a channel, a power, and the like.

Additionally, a signal analyzer 1012 may evaluate a pilot obtained via receiver 1002 as well as any interference. The signal analyzer 1012 may determine the strength of the pilot, the strength of the interference, and the like. Further, signal analyzer 1012 may estimate a signal to interference noise ratio (SINR) associated with a received transmission (e.g., pilot). The SINR may be an estimate of a SINR associated with a future transmission of data. Resource assigner 1010 may utilize the SINR to assign a rate (e.g., coding format, modulation format, etc.) to be utilized for the future transmission. User device 1000 still further comprises a modulator 1014 and a transmitter 1016 that transmits the signal to, for instance, an access point, another user device, etc. Although depicted as being separate from the processor 1006, it is to be appreciated that resource assigner 1010, signal analyzer 1012 and/or modulator 1014 may be part of processor 1006 or a number of processors (not shown).

Figure 11:
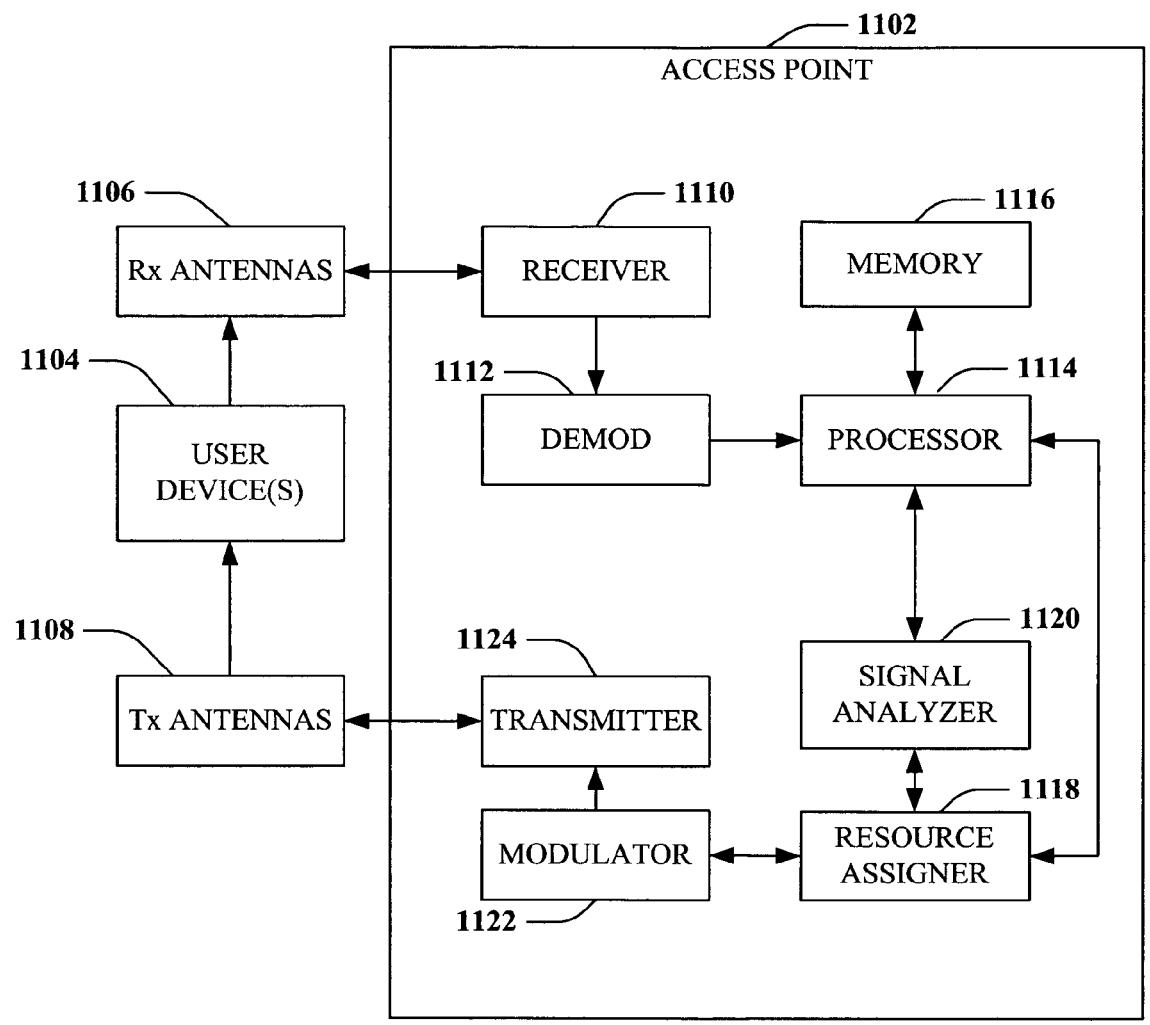
FIG. 11 is an illustration of a system that facilitates estimating a signal to interference noise ratio (SINR) associated with communication via a channel and selecting a rate to optimize capacity.

FIG. 11 is an illustration of a system 1100 that facilitates estimating a signal to interference noise ratio (SINR) associated with communication via a channel and selecting a rate to optimize capacity. System 1100 comprises an access point 1102 with a receiver 1110 that receives signal(s) from one or more user devices 1104 through a plurality of receive antennas 1106, and a transmitter 1122 that transmits to the one or more user devices 1104 through a transmit antenna 1108. Receiver 1110 can receive information from receive antennas 1106 and is operatively associated with a demodulator 1112 that demodulates received information. Demodulated symbols are analyzed by a processor 1114 that can be similar to the processor described above with regard to FIG. 10, and which is coupled to a memory 1116 that stores information related to estimating a signal (e.g., pilot) strength and/or interference strength, data to be transmitted to or received from user device(s) 1104 (or a disparate access point (not shown)), and/or any other suitable information related to performing the various actions and functions set forth herein. Processor 1114 is further coupled to a resource assigner 1118 that allocates resources to be utilized by a remote node for transmission. By way of example, if a request is received, resource assigner 1118 may identify a channel, a power, etc. to be utilized by the requesting node. Thereafter, resource assigner 1118 may provide information associated with the allocated resources, which may be related to a grant, to a modulator 1122. Modulator 1122 can multiplex the signal (including information associated with the grant) for transmission by a transmitter 1126 through antenna 1108 to user device(s) 1104.

Additionally, processor 1114 may be coupled to a signal analyzer 1120 that evaluates a pilot received by access point 1102. Signal analyzer 1120 may determine a signal to interference noise ratio (SINR) associated with the received pilot transmission. The SINR information may be provided to resource assigner 1118, which may utilize such information to assign a rate. The assigned rate information (and/or resources related to the grant) may be appended to a signal generated by processor 1114 for transmission to user device(s) 1104, may be multiplexed by modulator 1122, and may be transmitted via transmitter 1124. Although depicted as being separate from the processor 1114, it is to be appreciated that resource assigner 1118, signal analyzer 1120 and/or modulator 1122 may be part of processor 1114 or a number of processors (not shown). Additionally or alternatively, it is to be appreciated that resource assigner 1118 may be two separate components (not shown). Thus, in accordance with such example, one component may generate information associated with the grant and a second component may determine information associated with the rate.

Figure 12:
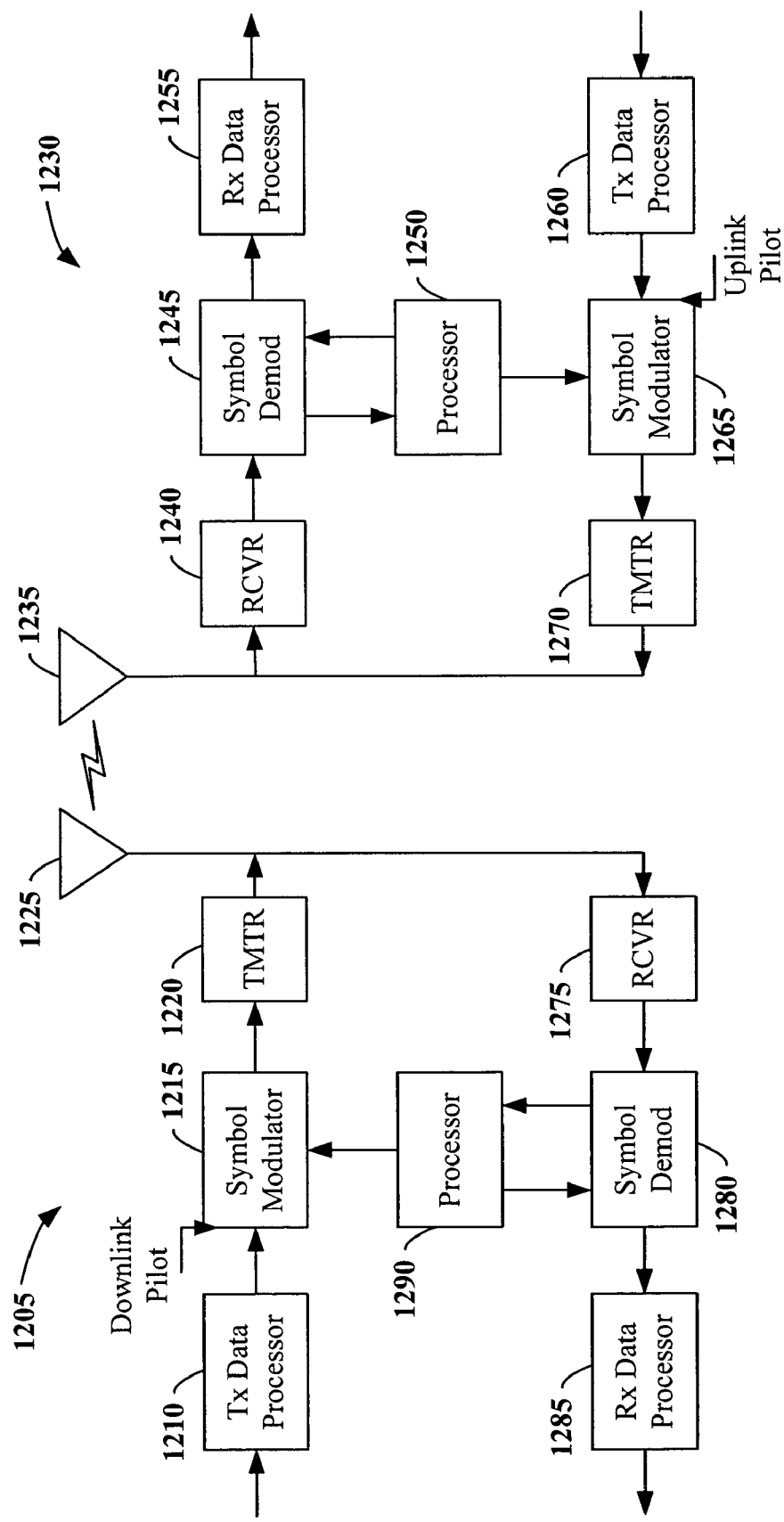
FIG. 12 is an illustration of a wireless network environment that can be employed in conjunction with the various systems and methods described herein.

FIG. 12 shows an exemplary wireless communication system 1200. The wireless communication system 1200 depicts one access point and one terminal for sake of brevity. However, it is to be appreciated that the system can include more than one access point and/or more than one terminal, wherein additional access points and/or terminals can be substantially similar or different for the exemplary access point and terminal described below. In addition, it is to be appreciated that the access point and/or the terminal can employ the systems (FIGS. 1-2, 4 and 10-11) and/or methods (FIGS. 7-9) described herein to facilitate wireless communication there between.

Referring now to FIG. 12, on a downlink, at access point 1205, a transmit (TX) data processor 1210 receives, formats, codes, interleaves, and modulates (or symbol maps) traffic data and provides modulation symbols ("data symbols"). A symbol modulator 1215 receives and processes the data symbols and pilot symbols and provides a stream of symbols. A symbol modulator 1215 multiplexes data and pilot symbols and provides them to a transmitter unit (TMTR) 1220. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 1220 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1225 to the terminals. At terminal 1230, an antenna 1235 receives the downlink signal and provides a received signal to a receiver unit (RCVR) 1240. Receiver unit 1240 conditions (e.g., filters, amplifies, and frequency downconverts) the received signal and digitizes the conditioned signal to obtain samples. A symbol demodulator 1245 demodulates and provides received pilot symbols to a processor 1250 for channel estimation. Symbol demodulator 1245 further receives a frequency response estimate for the downlink from processor 1250, performs data demodulation on the received data symbols to obtain data symbol estimates (which are estimates of the transmitted data symbols), and provides the data symbol estimates to an RX data processor 1255, which demodulates (i.e., symbol demaps), deinterleaves, and decodes the data symbol estimates to recover the transmitted traffic data. The processing by symbol demodulator 1245 and RX data processor 1255 is complementary to the processing by symbol modulator 1215 and TX data processor 1210, respectively, at access point 1205.

On the uplink, a TX data processor 1260 processes traffic data and provides data symbols. A symbol modulator 1265 receives and multiplexes the data symbols with pilot symbols, performs modulation, and provides a stream of symbols. A transmitter unit 1270 then receives and processes the stream of symbols to generate an uplink signal, which is transmitted by the antenna 1235 to the access point 1205.

At access point 1205, the uplink signal from terminal 1230 is received by the antenna 1225 and processed by a receiver unit 1275 to obtain samples. A symbol demodulator 1280 then processes the samples and provides received pilot symbols and data symbol estimates for the uplink. An RX data processor 1285 processes the data symbol estimates to recover the traffic data transmitted by terminal 1230. A processor 1290 performs channel estimation for each active terminal transmitting on the uplink. Multiple terminals may transmit pilot concurrently on the uplink on their respective assigned sets of pilot subbands, where the pilot subband sets may be interlaced.

Processors 1290 and 1250 direct (e.g., control, coordinate, manage, etc.) operation at access point 1205 and terminal 1230, respectively. Respective processors 1290 and 1250 can be associated with memory units (not shown) that store program codes and data. Processors 1290 and 1250 can also perform computations to derive frequency and impulse response estimates for the uplink and downlink, respectively.

For a multiple-access system (e.g., FDMA, OFDMA, CDMA, TDMA, etc.), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1290 and 1250.

Figure 13:
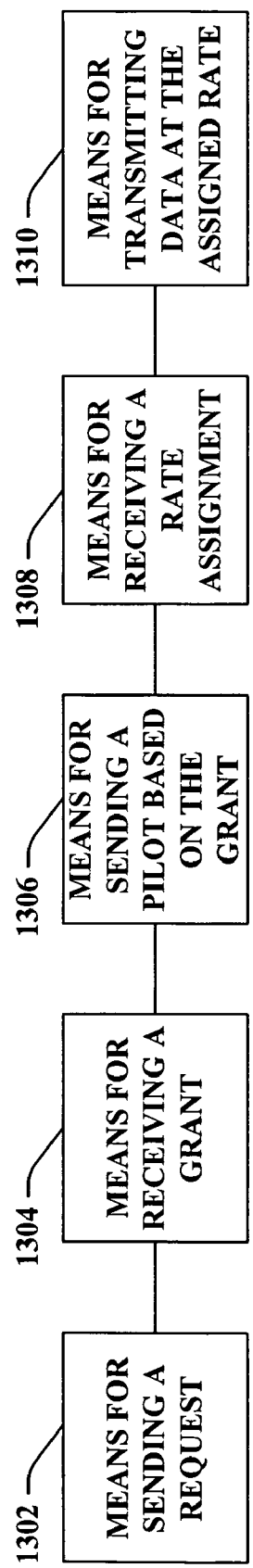
FIG. 13 is an illustration of a system for estimating a channel and predicting a rate based upon a signal to interference noise ratio (SINR).

With reference to FIG. 13, illustrated is a system 1300 for estimating a channel and predicting a rate based upon a signal to interference noise ratio (SINR). It is to be appreciated that system 1300 is represented as including functional blocks, which can be functional blocks that represent functions implemented by a processor, software, or combination thereof (e.g., firmware). System 1300 can be implemented in a wireless device and can include means for sending a request 1302. The request may be transmitted to any disparate node. System 1300 can also include means for receiving a grant 1304. The grant may assign a channel and/or power to be utilized. Additionally, system 1300 may comprise means for sending a pilot based on the grant 1306. The pilot may be transmitted on the granted channel and/or at the assigned power. Further, system 1300 may include means for receiving a rate assignment 1308 that provides a rate at which data is to be transmitted. The rate may provide a coding format and/or a modulation format. Moreover, system 1300 may comprise means for transmitting data at the assigned rate 1310.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of wireless communication comprising:
   performing a handshake with a node prior to data transmission to the node, wherein the performing the handshake comprises:
   sending a request to the node;
   receiving a grant of a channel responsive to the request from the node, wherein the grant includes a channel identification to assign the channel;
   sending a pilot to the node utilizing the granted channel assignment; and
   receiving a rate assignment from the node based on a signal to interference noise ratio associated with the pilot; and
   transmitting data to the node at the assigned rate.

2. The method of claim 1, the channel assignment being one or more of a frequency band, a time slot, and a spreading code assignment.

3. The method of claim 1, wherein the grant provides hybrid automatic repeat request (HARQ) information including at least one of a HARQ fragment number, data indicating whether a transmitter should transmit a new packet, and a HARQ retransmission of an old packet.

4. The method of claim 1, wherein the grant of the channel assignment includes an assigned power.

5. The method of claim 4, wherein the pilot is sent at the assigned power.

6. The method of claim 4, wherein the data is transmitted at the assigned power.

7. The method of claim 1, wherein the request is sent to an intended recipient.

8. The method of claim 1, further comprising pipelining the data by sending the request to an intermediate node within a multihop topology.

9. The method of claim 1, wherein the data is transmitted on a substantially similar channel and at a substantially similar power as compared to sending of the pilot.

10. The method of claim 1, wherein the rate assignment includes at least one of a modulation format and a coding format.

11. The method of claim 1, further comprising interlacing a second data transmission.

12. The method of claim 11, wherein interlacing the second data transmission further comprises:
    sending a second request to a second node during a first time slot during which the pilot is sent;
    receiving a second grant from the second node during a second time slot during which the rate assignment is received;
    transmitting a second pilot to the second node according to the second grant during a third time slot during which the data is transmitted;
    receiving a second rate assignment from the second node; and
    transmitting a second data block to the second node based upon the second rate assignment.

13. The method of claim 1, the pilot being sent prior to transmitting the data to obtain rate information at a receiver.

14. An apparatus that optimizes capacity in a wireless communication system, comprising:
    a memory that stores information associated with estimating a channel; and
    a processor, coupled to the memory, that is configured to:
    perform a handshake with a node prior to receiving data from the node, wherein the processor performs the handshake by:
    receiving a request from the node,
    transmitting a grant of a channel responsive to the request to the node, wherein the grant includes a channel identification to assign the channel;
    receiving a pilot transmitted from the node based upon the grant,
    estimating a signal to interference noise ratio (SINR) associated with the received pilot; and
    transmitting a rate assignment based on the SINR to the node.

15. The apparatus of claim 14, the processor being further configured to determine a strength of the pilot and a strength of interference.

16. The apparatus of claim 14, the processor being further configured to analyze the SINR based upon the pilot obtained from the node during a time slot and interference caused by at least one disparate node concurrently transmitting a disparate pilot during the time slot.

17. The apparatus of claim 14, wherein the rate assignment includes at least one of a coding format and a modulation format.

18. The apparatus of claim 14, the processor being further configured to transmit the grant in response to obtaining a request.

19. The apparatus of claim 14, the processor being further configured to transmit the grant that includes an assigned channel and an assigned power.

20. The apparatus of claim 19, the processor being further configured to evaluate the SINR of the received pilot transmitted with the assigned channel and the assigned power.

21. The apparatus of claim 20, the processor being further configured to estimate a SINR of data transmission based upon the SINR of the pilot by employing the assigned channel and the assigned power for both data transmission and pilot transmission for simultaneously transmitting nodes.

22. A wireless communication apparatus comprising:
    means for performing a handshake with a node prior to data transmission to the node, wherein the means for performing the handshake comprises:
    means for transmitting a request to the node;
    means for receiving a grant of a channel in response to the request from the node, wherein the grant includes a channel identification to assign the channel;
    means for transmitting a pilot to the node based on the grant; and
    means for receiving a rate assignment from the node based on a signal to interference noise ratio (SINR) associated with the pilot; and
    means for transmitting data to the node at the assigned rate.

23. The apparatus of claim 22, wherein the grant includes at least one of an assigned channel and an assigned power.

24. The apparatus of claim 22, wherein the rate assignment includes at least one of a coding format and a modulation format.

25. A computer-readable storage medium encoded with instructions executable by at least one computer for performing a method of wireless communication, the method comprising:

performing a handshake with a node prior to receiving data from the node, wherein the performing the handshake comprises:

receiving a request from the node;

transmitting a grant of a channel assignment responsive to the request to the node, wherein the grant includes a channel identification to assign the channel;

receiving a pilot from the node on the granted channel;

determining a signal to interference noise ratio (SINR) associated with the received pilot; and transmitting a rate to the node based on the SINR; and receiving data from the node at the assigned rate.

26. An apparatus that optimizes capacity in a wireless communication system, comprising:

a memory that stores information associated with transmitting data; and a processor, coupled to the memory, that is configured to:

perform a handshake with a node prior to data transmission to the node, wherein processor performs the handshake by:

sending a request to the node, receiving a grant of a channel responsive to the request from the node, wherein the grant includes a channel identification to assign the channel;

sending a pilot to the node utilizing the granted channel assignment; and receiving a rate assignment from the node based on a signal to interference noise ratio (SINR) associated with the pilot; and transmit data to the node at the assigned rate.

27. The apparatus of claim 26, wherein the channel assignment is one or more of a frequency band, a time slot, and a spreading code assignment.

28. The apparatus of claim 26, wherein the grant provides hybrid automatic repeat request (HARQ) information including a least one of a HARQ fragment number, data indicating whether a transmitter should transmit a new packet, and a HARQ retransmission of an old packet.

29. The apparatus of claim 26, wherein the grant of the channel assignment includes an assigned power.

30. The apparatus of claim 29, wherein the pilot is sent at the assigned power.

31. The apparatus of claim 29, wherein the data is transmitted at the assigned power.

32. The apparatus of claim 26, wherein the request is sent to an intended recipient.

33. The apparatus of claim 26, the processor being further configured to pipeline the data by sending the request to an intermediate node within a multihop topology.

34. The apparatus of claim 26, wherein the data is transmitted on a substantially similar channel and at a substantially similar power as compared to sending of the pilot.

35. The apparatus of claim 26, wherein the rate assignment includes at least one of a modulation format and a coding format.

36. The apparatus of claim 26, the processor being further configured to interlace a second data transmission.

37. The apparatus of claim 36, the processor being further configured to:

send a second request to a second node during a first time slot during which the pilot is sent;

receive a second grant from the second node during a second time slot during which the rate assignment is received;

transmit a second pilot to the second node according to the second grant during a third time slot during which the data is transmitted;

receive a second rate assignment from the second node; and transmit a second data block to the second node based upon the second rate assignment.

38. The apparatus of claim 26, wherein the pilot is sent prior to transmitting the data to obtain rate information at a receiver.

39. A computer-readable storage medium encoded with instructions executable by at least one computer for performing a method of wireless communication, the method comprising:

performing a handshake with a node prior to data transmission to the node, wherein the performing the handshake comprises:

sending a request to the node;

receiving a grant of a channel responsive to the request from the node, wherein the grant includes a channel identification to assign the channel;

sending a pilot to the node utilizing the granted channel assignment; and receiving a rate assignment from the node based on a signal to interference noise ratio (SINR) associated with the pilot; and transmitting data to the node at the assigned rate.

40. A method of wireless communication that estimates channel interference, comprising:

performing a handshake with a node prior to receiving data from the node, wherein the performing the handshake comprises:

receiving a request from the node;

transmitting a grant of a channel responsive to the request to the node, wherein the grant includes a channel identification to assign the channel;

receiving a pilot transmitted from the node based upon the grant;

estimating a signal to interference noise ratio (SINR) associated with the received pilot; and transmitting a rate assignment based on the SINR to the node.

41. The method of claim 40, further comprising determining a strength of the pilot and a strength of interference.

42. The method of claim 40, further comprising analyzing the SINR based upon the pilot obtained from the node during a time slot and interference caused by at least one disparate node concurrently transmitting a disparate pilot during the time slot.

43. The method of claim 40, wherein the rate assignment includes at least one of a coding format and a modulation format.

44. The method of claim 40, further comprising transmitting the grant in response to obtaining a request.

45. The method of claim 40, further comprising transmitting the grant that includes an assigned channel and an assigned power.

46. The method of claim 45, further comprising evaluating the SINR of the received pilot transmitted with the assigned channel and the assigned power.

47. The method of claim 46, further comprising estimating a SINR of data transmission based upon the SINR of the pilot by employing the assigned channel and the assigned power for both data transmission and pilot transmission for simultaneously transmitting nodes.

48. A wireless communication apparatus that estimates channel interference, comprising:

means for performing a handshake with a node prior to receiving data from the node, wherein the means for performing a handshake comprises:

means for receiving a request from the node;
means for transmitting a grant of a channel responsive to the request to the node, wherein the grant includes a channel identification to assign the channel;
means for receiving a pilot transmitted from the node based upon the grant;
means for estimating a signal to interference noise ratio (SINR) associated with the received pilot; and
means for transmitting a rate assignment based on the SINR to the node.

49. An access terminal, comprising:
an antenna;
a memory that stores information associated with estimating a channel;
a processor, coupled to the memory, that is configured to:
perform a handshake with a node prior to receiving data from the node, wherein the processor performs the handshake by:
receiving, via the antenna, a request from the node;
transmitting a grant of a channel responsive to the request to the node, wherein the grant includes a channel identification to assign the channel;
receiving a pilot transmitted from the node based upon the grant;
estimating a signal to interference noise ratio (SINR) associated with the received pilot; and
transmitting a rate assignment based on the SINR to the node.

50. An access point, comprising:
an antenna;
a memory that stores information associated with transmitting data; and
a processor, coupled to the memory, that is configured to:
perform a handshake with a node prior to data transmission to the node, wherein the processor performs the handshake by:
sending, via the antenna, a request to the node;
receiving a grant of a channel responsive to the request from the node, wherein the grant includes a channel identification to assign the channel;
sending a pilot to the node utilizing the granted channel assignment; and
receiving a rate assignment from the node based on a signal to interference noise ratio (SINR) associated with the pilot; and
transmit data to the node at the assigned rate.

* * * * *